United States Patent

Sumiyoshi

[19]

[11] Patent Number: 6,023,314
[45] Date of Patent: Feb. 8, 2000

[54] ELLIPTICALLY POLARIZING PLATE AND LIQUID CRYSTAL DISPLAY DEVICE USING SAME

[75] Inventor: Ken Sumiyoshi, Tokyo, Japan

[73] Assignee: NEC Corporation, Tokyo, Japan

[21] Appl. No.: 09/088,731

[22] Filed: Jun. 2, 1998

[30] Foreign Application Priority Data

Jun. 2, 1997 [JP] Japan .................................. 9-143961

[51] Int. Cl.⁷ .............................................. G02F 1/1335
[52] U.S. Cl. ................................................ 349/96; 349/98
[58] Field of Search ................................ 349/98, 96, 84

[56] References Cited

U.S. PATENT DOCUMENTS

| | | | |
|---|---|---|---|
| 5,245,456 | 9/1993 | Yoshimi et al. | 349/118 |
| 5,793,455 | 8/1998 | Nakamura | 349/96 |
| 5,796,454 | 8/1998 | Ma | 349/98 |

FOREIGN PATENT DOCUMENTS

| | | |
|---|---|---|
| 50-147755 | 11/1975 | Japan . |
| 54-115143 | 9/1979 | Japan . |
| 1-133003 | 5/1989 | Japan . |
| 9-243825 | 9/1997 | Japan . |

OTHER PUBLICATIONS

Okada Toyokazu, "Polymer Film Technology", *Third Address of the Liquid Crystal Young Researchers Conference*, p. 106.

*Primary Examiner*—William L. Sikes
*Assistant Examiner*—Dung Nguyen
*Attorney, Agent, or Firm*—Sughrue, Mion, Zinn, Macpeak & Seas, PLLC

[57] ABSTRACT

The elliptically polarizing plate of the present invention has a twisted structure in which a dichroic substance is fixed within a helical structure, and is designed to emit a fixed elliptically polarized light. Within the dichroic substance that forms the helical structure, incident light is divided into left elliptically polarized light and right elliptically polarized light and propagated within the helical structure, the left elliptically polarized light and the right elliptically polarized light rotate along the helical structure, and, in accordance with the helical direction of the helical structure, one of the left elliptically polarized light and the right elliptically polarized light is strongly absorbed and the other is weakly absorbed, whereby a fixed elliptically polarized light is emitted. A liquid crystal display device according to this invention uses the above-described elliptically polarizing plate.

3 Claims, 14 Drawing Sheets

$x = 2\pi \ (ne - no) \ d / (2\Theta \ \lambda)$

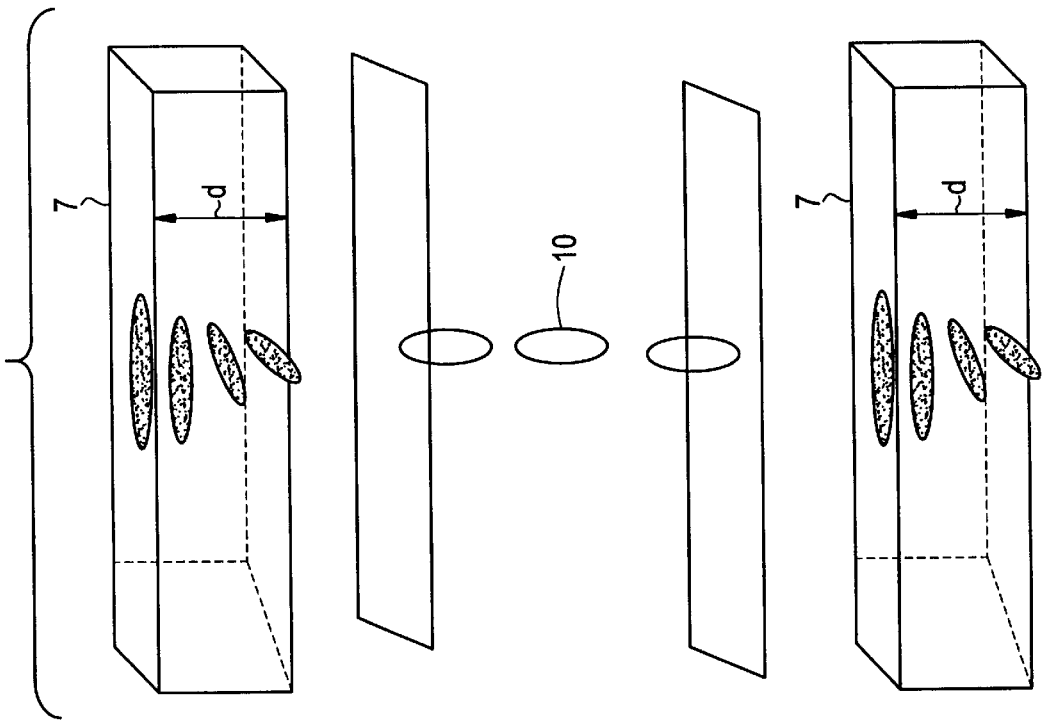
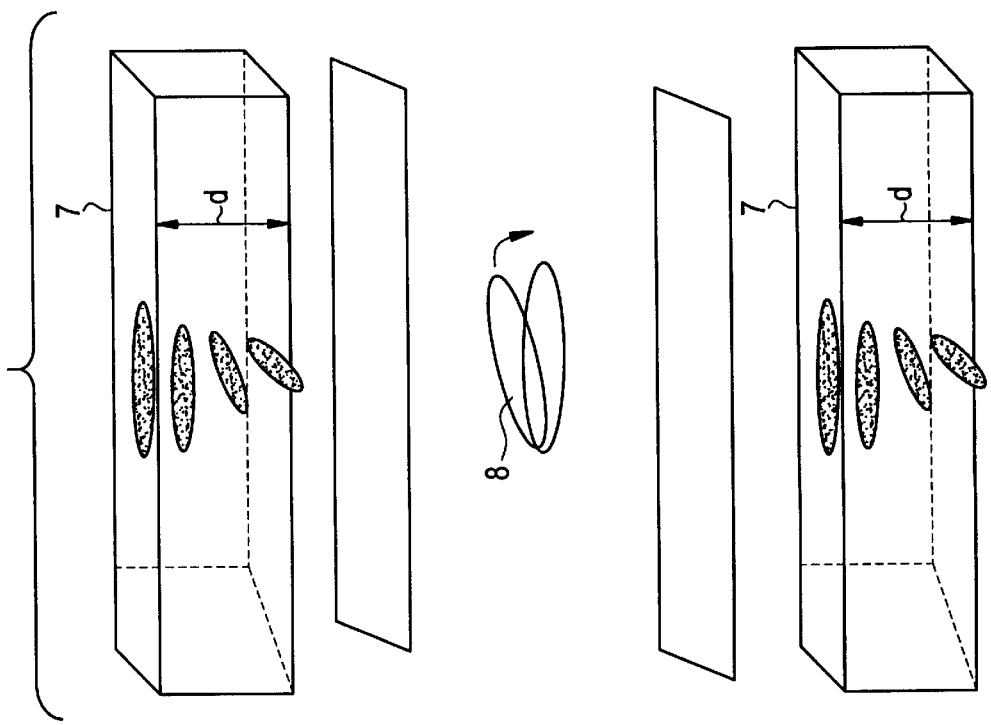

ELLIPTICALLY POLARIZING PLATE AND LIQUID CRYSTAL DISPLAY DEVICE USING SAME

BACKGROUND OF THE INVENTION

1. Field of the Invention

The present invention relates to an elliptically polarizing plate and a liquid crystal display device that uses an elliptically polarizing plate.

2. Description of the Related Art

Polarizing plates have conventionally been used in liquid crystal display devices, and a case that can be cited as an example of this type of polarizing plate is described in "Polymer Film Technology" by Okada Toyokazu in Third Address of the Liquid Crystal Young Researchers Conference on page 106 of "Year 2000 Liquid Crystal Research." Explanation is next presented regarding a polarizing plate of the prior art based on this example. FIG. 1 is a schematic view illustrating the effect of a linearly polarizing plate of the prior art.

Polarizing plates that have been put to practical use for current liquid crystal display devices are components in which a dichroic substance is adsorption oriented to drawn-oriented polyvinyl alcohol. In other words, macromolecular chain 17 of a polyvinyl alcohol is uniaxially oriented, and dichroic substance 1 is oriented so as to follow this chain and adsorbed. The dichroic substance generally has a spheroidal absorption coefficient. As a result, polarized light that vibrates in the orientation of the major axis of the spheroid exhibits a large absorption coefficient and polarized light that vibrates in the orientation of the minor axis of the spheroid exhibits a small absorption coefficient.

Incident light 16 to a polarizing plate is generally in a non-polarized state. In cases in which this light is irradiated onto a dichroic substance arrayed as shown in FIG. 1, polarized light of the major axis orientation (y orientation) of the dichroic substance is strongly absorbed, and polarized light of the minor axis orientation (x orientation) is weakly absorbed. As a result, light in a substantially linearly polarized state can be obtained as emitted polarized light 18. This minor axis orientation (x orientation) is referred to as the transmission axis of the polarizing plate. The foregoing explanation gives the principles for emission of linearly polarized light by a polarizing plate employing a dichroic pigment.

A liquid crystal display device generally includes one pair of sheet polarizers. Particularly in liquid crystal display devices having a high contrast ratio, the transmission axes of two sheet polarizers are arranged orthogonally. To explain in more detail, the contrast ratio is defined as (the transmittance of a light state) divided by (transmittance of dark state). As a result, a dark state of low transmittance must be realized for the entire range of visible light in order to achieve a high contrast ratio. This state can be realized when the liquid crystal is perpendicular to the substrate surface between sheet polarizers having orthogonal transmission axes.

As an actual example, it is known that a homeotropic liquid crystal, in which a perpendicularly oriented liquid crystal is enclosed between polarizing plates having orthogonal transmission axes, has a high contrast ratio. It is further known that a case in which twisted nematic liquid crystal is enclosed between polarizing plates having orthogonal transmission axes also has a high contrast ratio. In these cases, a dark state can be obtained when voltage is impressed to the twisted nematic liquid crystal to bring about perpendicular orientation.

As described hereinabove, the high contrast ratio of the liquid crystal display devices results from polarizing plates having orthogonal transmission axes.

Recent years have seen the development of methods that provide remarkable improvement in the visual angle dependency of liquid crystal display devices. However, the visual angle dependency of the polarizing plates imposes an upper limit on such widening of the angle of field. This point is discussed in further detail hereinbelow.

The visual angle dependency of a single linearly polarizing plate of the prior art is first explained with reference to FIG. 2. A linearly polarizing plate of the prior art has a spheroid absorption coefficient as shown in FIG. 2. When viewed from the front [from the z axis], there is a difference between the absorption coefficient $\alpha e$ corresponding to the elliptic major axis, which is the x-axis azimuth, and the absorption coefficient $\alpha o$ corresponding to the elliptic minor axis, which is the y-axis; and this difference brings about the dichroic ratio. No change occurs in the two absorption coefficients $\alpha e$ and $\alpha o$ if the direction of view is inclined from the front to the A bearing as shown in FIG. 2, but absorption coefficient $\alpha o$ appears to decrease if the direction of view inclines to the B bearing of FIG. 2, and the dichroic ratio therefore appears to fall at the B bearing. For these reasons, visual angle dependency is great at particular bearing angles in a linearly polarizing plate of the prior art.

The visual angle dependency for a case in which the transmission axes of these linearly polarizing plates are arranged orthogonally is next considered. Transmittance rises in a case in which this pair of polarizing plates is viewed from an angle. This is because the transmission axes of the polarizing plates appear to diverge from 90 degrees when viewed from an angle even though the axes are orthogonal when viewed from the front. As a result, high transmittance is exhibited when viewed from an angle even though low transmittance is exhibited from the front. Accordingly, despite some improvement in the visual angle dependency of the liquid crystal display medium, the visual angle dependency of polarizing plates having orthogonal transmission axes still remains. As described hereinabove, the visual angle dependency of a polarizing plate determines the upper limit of the angle of field characteristic of a liquid crystal display device.

SUMMARY OF THE INVENTION

In view of the above-described problems of the prior art, the object of the present invention is to provide an elliptically polarizing plate that improves visual angle dependency and a liquid crystal display device that uses such an elliptically polarizing plate.

The elliptically polarizing plate of the present invention:

has a twisted structure in which a dichroic substance is fixed within a helical structure; and is designed such that: incident light is divided into left elliptically polarized light and right elliptically polarized light within a dichroic substance that forms a helical structure and is propagated within the helical structure; the left elliptically polarized light and the right elliptically polarized light are rotated along the helical structure; one of the left elliptically polarized light and right elliptically polarized light is strongly absorbed and the other is weakly absorbed by the helical direction of the helical structure; and a fixed elliptically polarized light is emitted.

The liquid crystal display device of the present invention comprises:

a pair of elliptically polarizing plates having the above-described left helical structure or right helical structure;

a liquid crystal layer which is arranged between the pair of elliptically polarizing plates; and means in which light or dark is displayed according to whether or not birefringence occurs in the liquid crystal layer.

In addition, the liquid crystal display device of the present invention comprises:

one elliptically polarizing plate having the above-described left helical structure or right helical structure;

a liquid crystal layer which is arranged between a reflection plate and one elliptically polarizing plate; and means in which:

the fixed elliptically polarized light emitted by the elliptically polarizing plate is incident upon the liquid crystal layer and the elliptically polarized light is modulated; the direction of rotation of the elliptically polarized light is reversed when it reaches the reflection plate; the elliptically polarized light is again modulated in the liquid crystal layer, thereby the magnitude of modulation in the liquid crystal layer is regulated; and light or dark is displayed.

Accordingly, the elliptically polarizing plate of the present invention has a twisted structure whereby an elliptically polarizing plate having improved visual angle dependency and a liquid crystal display device using this elliptically polarizing plate can be provided.

BRIEF DESCRIPTION OF THE DRAWINGS

FIG. 18 is a structural view of the liquid crystal display device of the second embodiment of the present invention;

FIG. 19 is a structural view of the liquid crystal display device of the second embodiment of the present invention.

DETAILED DESCRIPTION OF THE PREFERRED EMBODIMENTS

The first embodiment of the present invention is an elliptically polarizing plate having a twisted structure in which a dichroic substance is fixed, and is designed so as to emit a fixed elliptically polarized light. The second embodiment of the present invention is a liquid crystal display device that uses two elliptically polarizing plates according to the first embodiment of the present invention.

Figure 3:
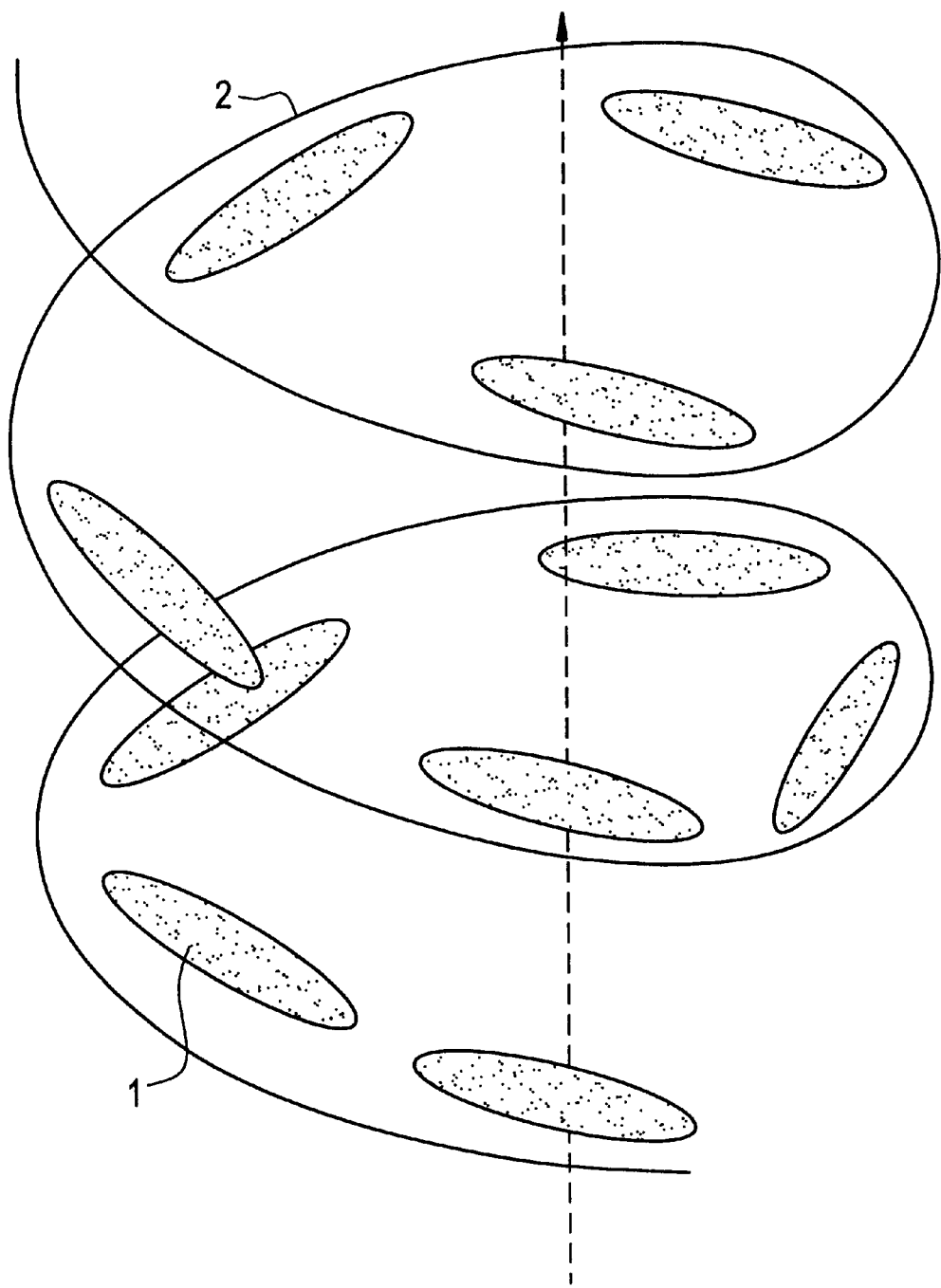
FIG. 3 is a schematic view showing the first embodiment of the present invention.
Figure 4:
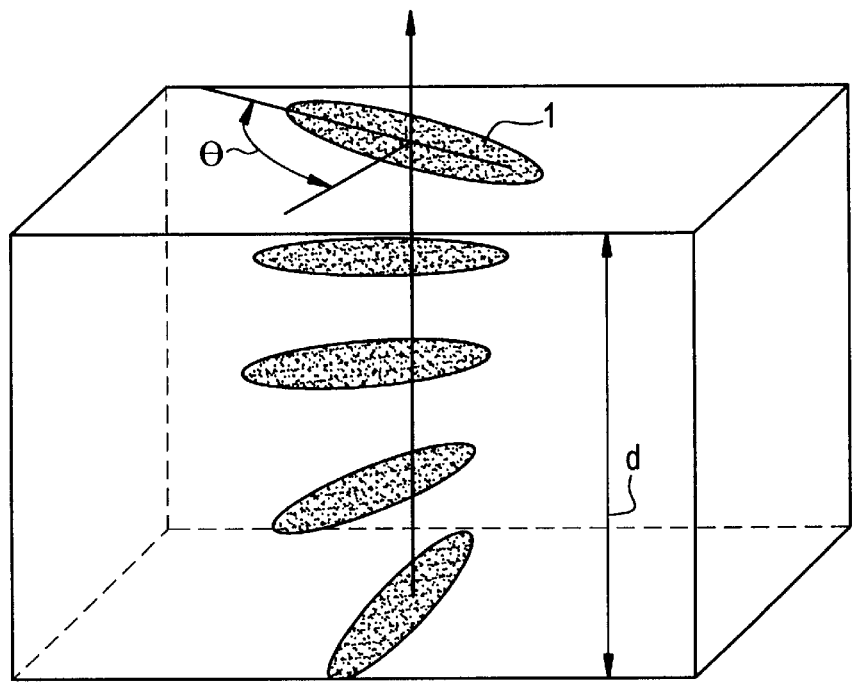
FIG. 4 is a schematic view showing the first embodiment of the present invention.

The first embodiment of the present invention is next described with reference to FIG. 3. In the first embodiment of the present invention, dichroic substance 1 is arranged and fixed within helical structure 2. The following explanation applies principally to a case of a helical structure of one pitch or less such as shown in FIG. 4.

The dichroic substance generally has a refractive index (ne) and absorption coefficient ($\alpha$e) corresponding to the major axis orientation and a refractive index (no) and absorption coefficient ($\alpha$o) corresponding to the minor axis orientation. In this case, the major axis orientation of the dichroic substance of the light incident surface and the major axis orientation of the dichroic substance of the light emitting surface form an angle ($\theta$). In addition, the space between the light incident surface and light emitting surface, i.e., the thickness, is d. The propagation of light within the elliptically polarizing plates of this invention can be explained by the above-described five values. A light beam is split into left elliptically polarized light and right elliptically polarized light and propagated within the dichroic substance that forms this helical structure.

Figure 5:
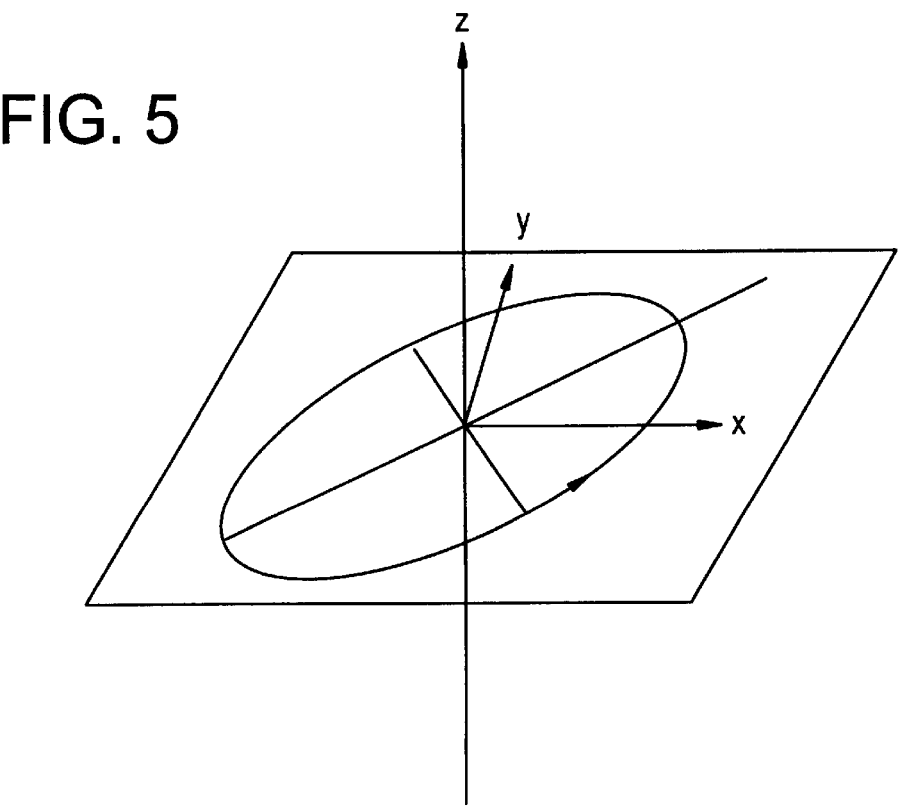
FIG. 5 is an explanatory view of elliptically polarized light.

The present invention is described below with reference to this elliptically polarized light, beginning with an explanation of the characteristics of elliptically polarized light with reference to FIG. 5. FIG. 5 plots the track of a field vector of elliptically polarized light for a case in which the direction of progression of light is straight ahead and out from the surface of the figure. The field vector describes an ellipse within a plane that is perpendicular to the direction of progression of light. The ellipticity (the ratio of the elliptic major axis to the elliptic minor axis), the elliptic orientation (orientation of the ellipse major axis), and the direction of rotation (left elliptically polarized light or right elliptically polarized light) can be offered as values that establish the characteristics of this elliptically polarized light.

Figure 6:
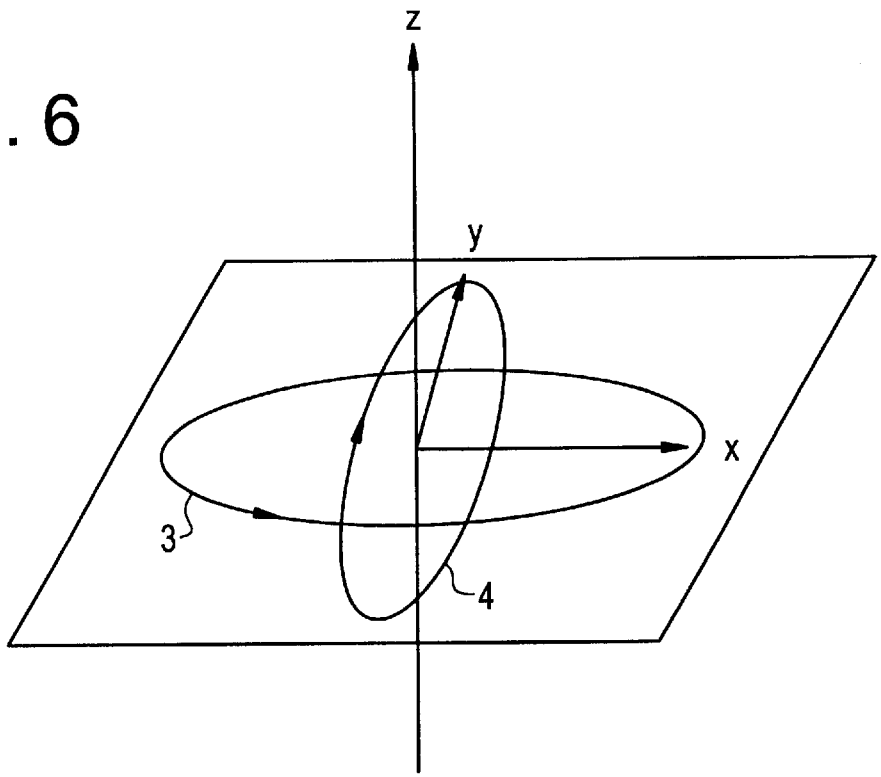
FIG. 6 is an explanatory view of orthogonal elliptically polarized light.
Figure 7:
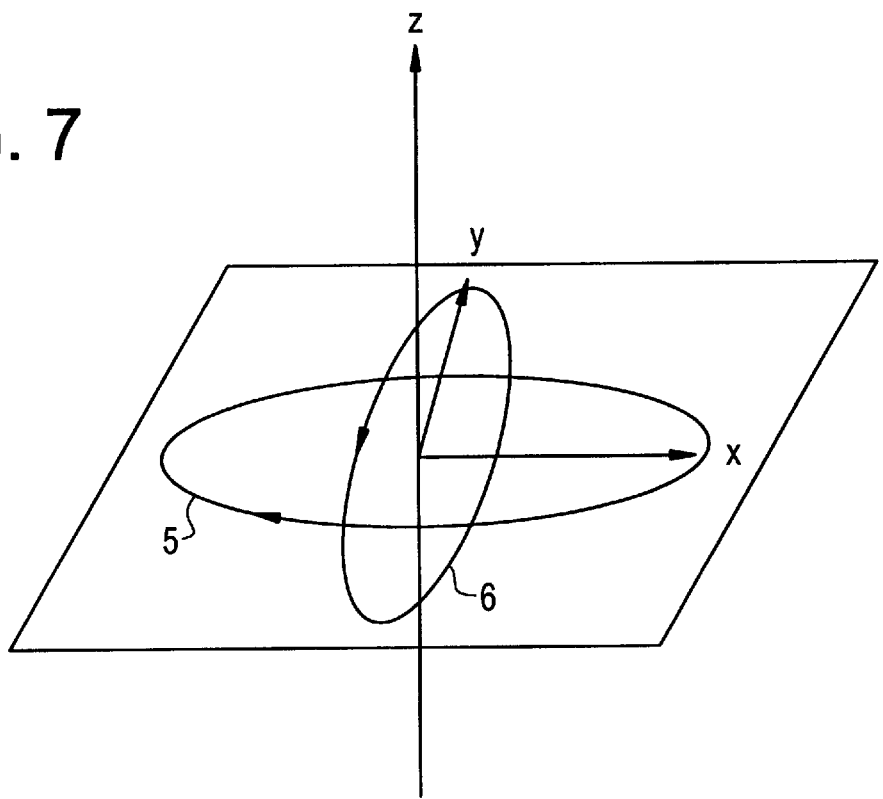
FIG. 7 is an explanatory view of orthogonal elliptically polarized light.

The two types of elliptically polarized light of FIG. 6 are defined based on these characteristic values. l-polarized light 3 and r-polarized light 4 of FIG. 6 are left elliptically polarized light and right elliptically polarized light having equal ellipticity and for which the elliptic orientation are orthogonal at 90°. Elliptically polarized light resulting from rotating these polarized light components 90° as shown in FIG. 7 is referred to as r*-polarized light 6 and l*-polarized light 5. Accordingly, r*-polarized light is left elliptically polarized light, and l*-polarized light is right elliptically polarized light.

Figure 8:
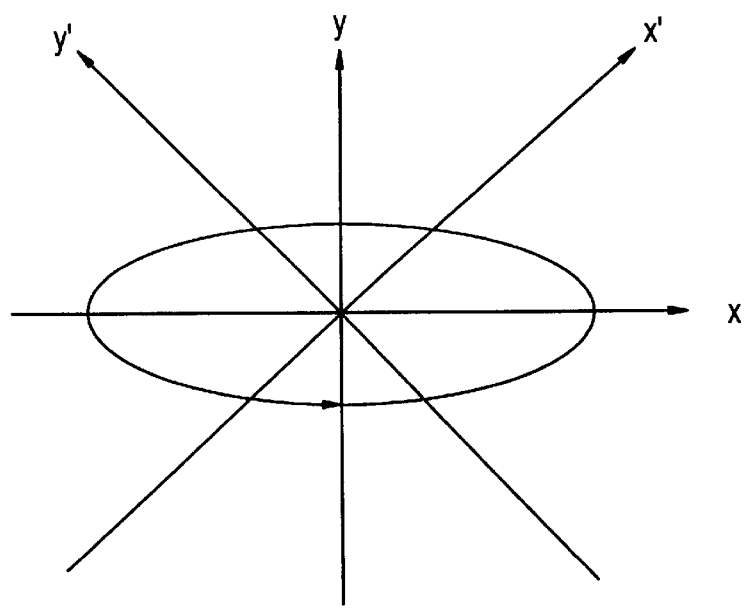
FIG. 8 is a plan view for explaining elliptically polarized light.
Figure 9:
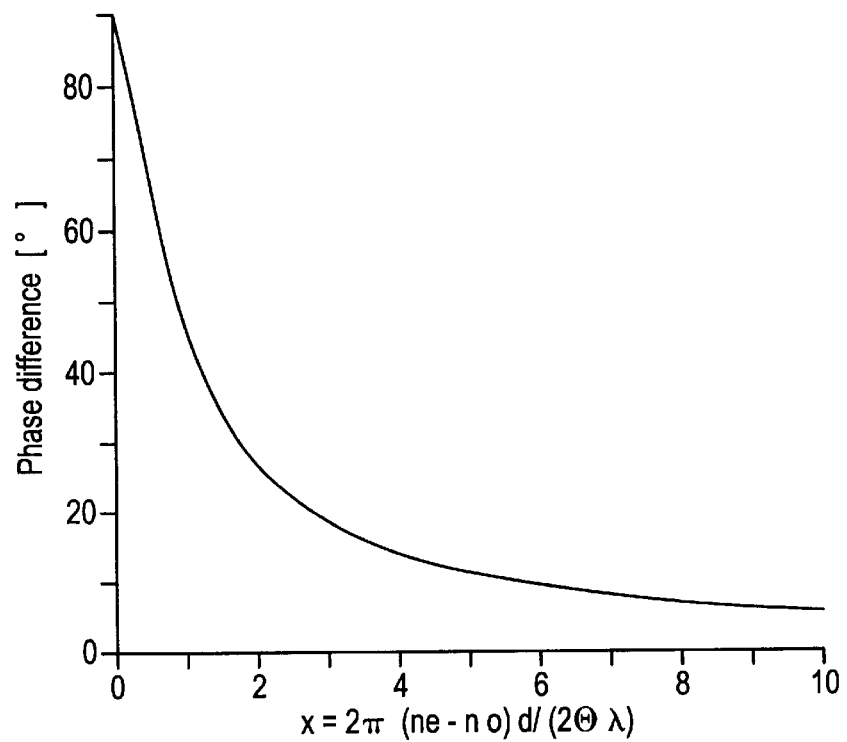
FIG. 9 illustrates the relation between the structural constants of an elliptically polarizing plate and phase difference of an elliptically polarizing plate.

Each type of elliptically polarized light can be considered as the synthesis of linearly polarized light components that vibrate on the x-axis and y-axis as shown in FIG. 8. In this case, however, the phase of the linearly polarized light components in the x-axis direction and y-axis direction shifts by 90°. On the other hand, both elliptically polarized light components can be considered as the synthesis of linearly polarized light components that vibrate on the x'-axis and y'-axis in FIG. 8. In this case, amplitude in the x'-axis and y'-axis orientations are equal. The phase difference of the two amplitudes is determined by $x=2\pi(ne - no) d/(2\theta\lambda)$, where $\lambda$ is the wavelength of light. FIG. 9 shows an example of the computation of these phase differences.

In FIG. 9, the phase difference at the limit of $x \rightarrow 0$ is 90°, which means that the phase difference of the linearly polarized light components in the x'-axis direction and the y'-axis direction are 90° apart. In other words, polarized light that can be propagated in this case is left circularly polarized light and right circularly polarized light. On the other hand, the phase difference is 0° for $x \rightarrow \infty$. The linearly polarized light for the x'-axis direction and y'-axis direction has the same phase. In this case, the polarized light that can be propagated is made up of two linearly polarized light [components] having orthogonal directions of vibration. Generally, the polarized light that can be propagated between the two limits is r-polarized light and l-polarized light shown in FIG. 6.

When propagated within the helical structure, this r-polarized light and l-polarized light rotate with the helical structure. As a result, the emitted light is r-polarized light and l-polarized light that have rotated exactly the angle ($\theta$).

Figure 1:
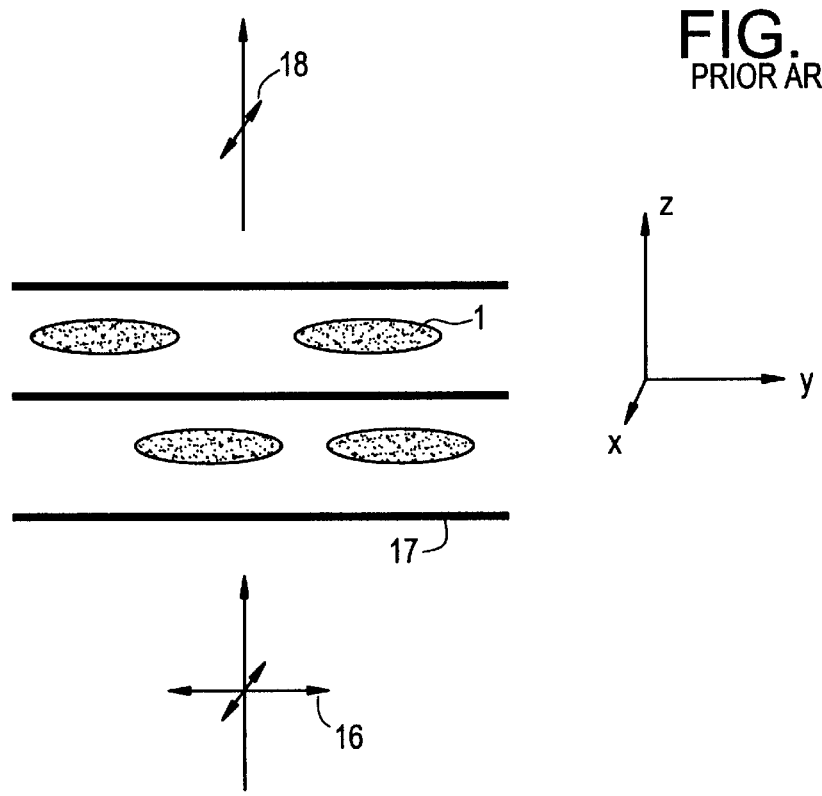
FIG. 1 is a explanatory view of the action of a linearly polarizing plate of the prior art.
Figure 2:
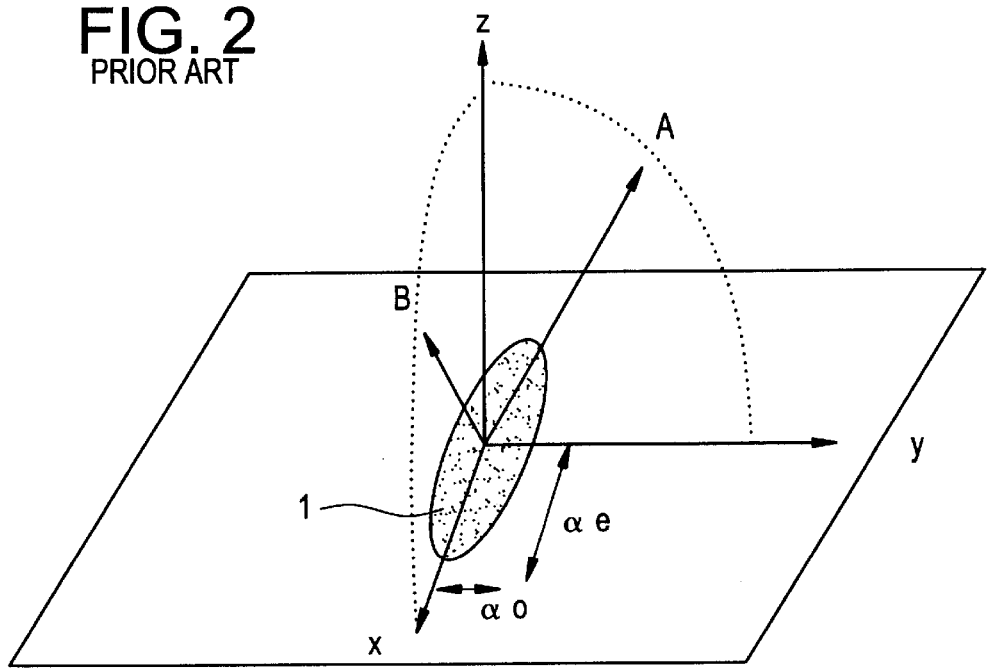
FIG. 2 is a perspective view showing the visual angle dependency of a linearly polarizing plate of the prior art.

Explanation next regards a case in which absorption occurs. In this case, either l-polarized light or r-polarized light is strongly absorbed, and the other is weakly absorbed. The magnitudes of these two absorptions are determined by the helical direction of the helical structure. At the limit of $x \rightarrow \infty$, l-polarized light and r-polarized light become two orthogonal components of linearly polarized light. The strong absorption in this case corresponds to absorption in the major axis direction, and the weak absorption corresponds to absorption in the minor axis direction as explained in FIG. 1. Accordingly, one component of polarized light is strongly absorbed and cannot be emitted, while the other component of polarized light is emitted.

As described hereinabove, the use of the structure of the first embodiment of the present invention enables emission of only a fixed elliptically polarized light. In addition, the ellipticity of this emitted elliptically polarized light can be designed by means of $x=2\pi(ne-no) d/(2\theta\lambda)$. Further, the orientation of the emitted elliptically polarized light can be designed by means of angle $\theta$. Finally, the direction of rotation of the elliptically polarized light can be designed by means of the helical direction of the helical structure.

The above-described elliptically polarizing plate of the present invention has a twisted structure. The improvement in visual angle dependency achieved by means of this structure is next described hereinbelow.

Figure 10:
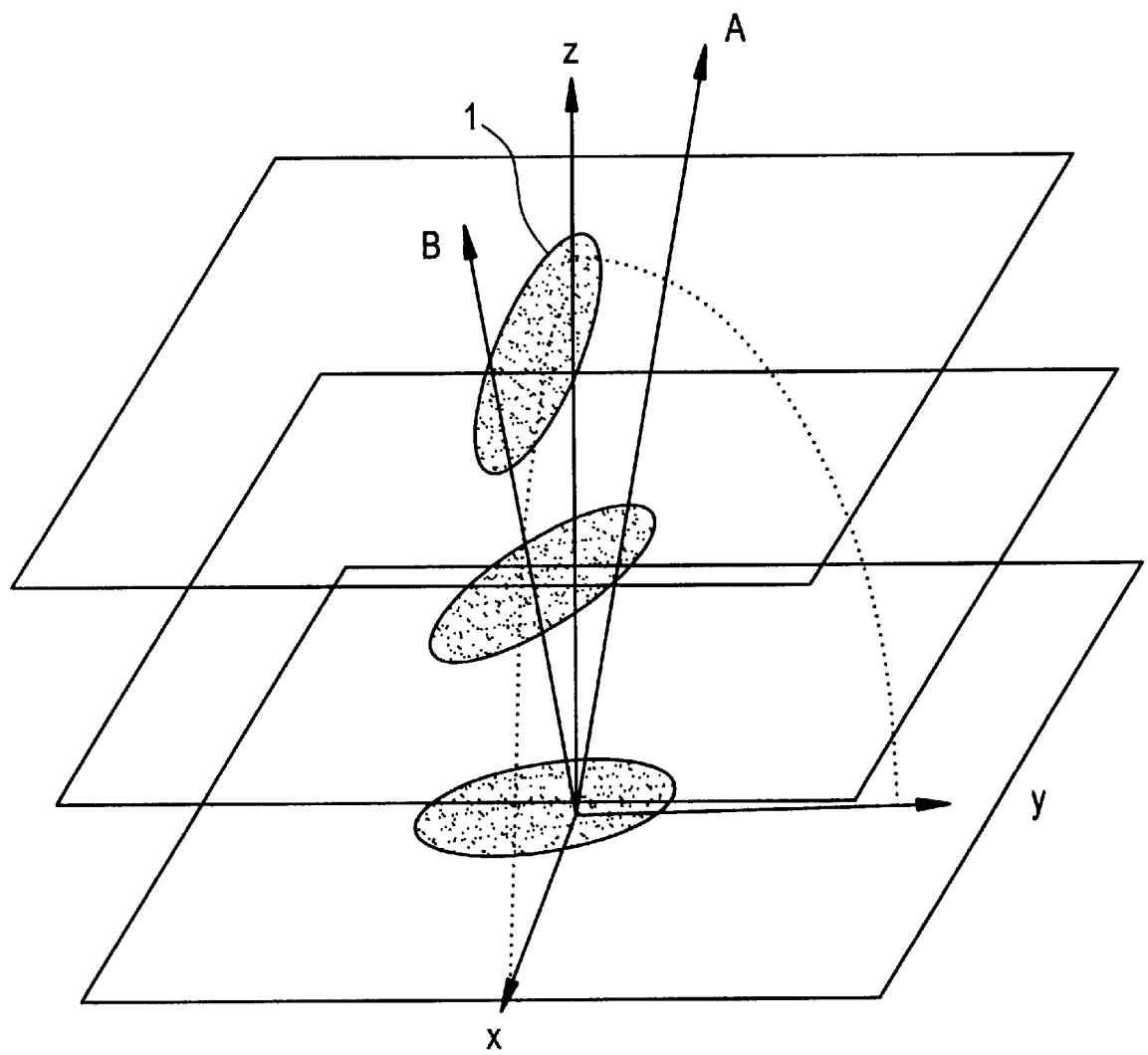
FIG. 10 is a perspective view for explaining the visual angle characteristics of an elliptically polarizing plate according to the first embodiment of the present invention.

In the elliptically polarizing plate of this invention, however, there is no characteristic hearing of inclination because the spheroid that represents the absorption coefficient is arranged rotated around the z-axis as shown in FIG. 10. In other words, the change in the absorption coefficient is identical whether inclination is to the x-axis bearing or to the y-axis bearing of FIG. 10, and the visual angle characteristic is thus superior to a linearly polarizing plate of the prior art even in a configuration employing a single sheet polarizer.

Figure 11:
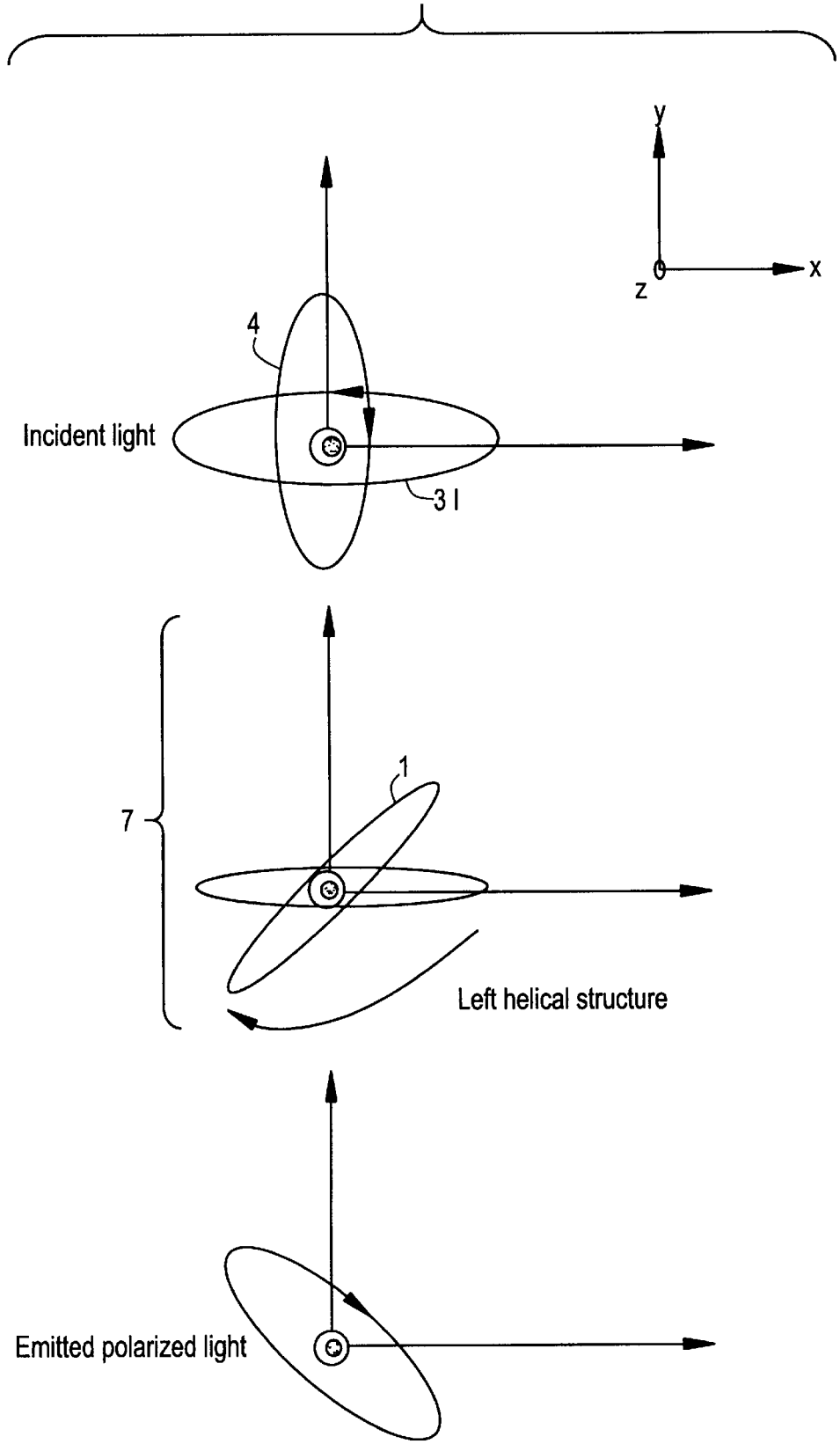
FIG. 11 is a plan view for illustrating the state of polarized light before and after passing through an elliptically polarizing plate.
Figure 12:
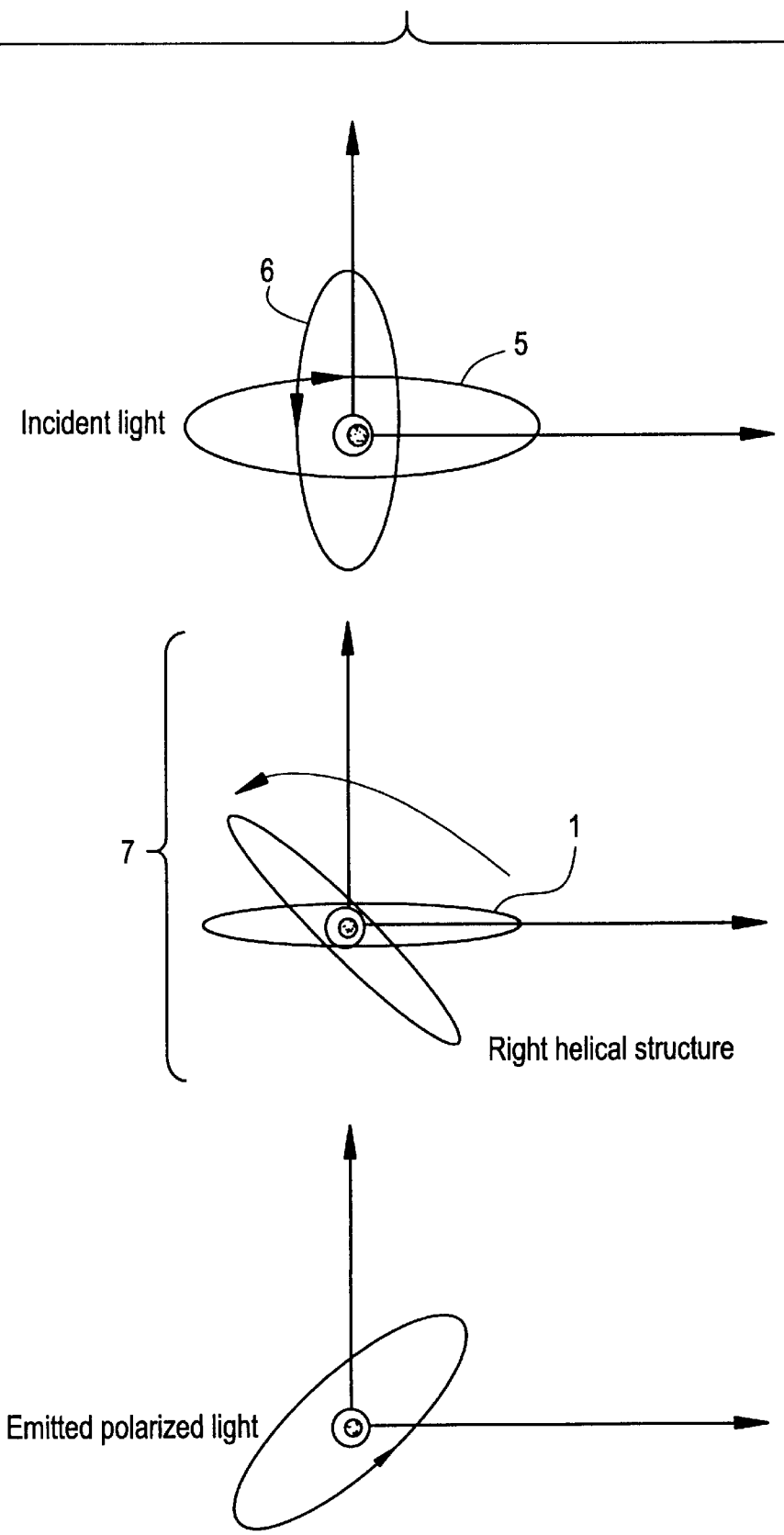
FIG. 12 is a plan view for illustrating the state of polarized light before and after passing through an elliptically polarizing plate.

Explanation is next presented regarding the second embodiment of the present invention. It is first explained that an extinction state can be obtained using two elliptically polarizing paltes 7 of the first embodiment of the present invention. FIG. 11 illustrates the effect of left-twisted elliptically polarizing plate 7 having the left helical structure of the first embodiment of the present invention. Polarized light that can be propagated within this left-twisted elliptically polarizing plate is r-polarized light 4 and l-polarized light 3. Of these, l-polarized light 3 is selectively absorbed, and r-polarized light 4 is optically rotated and emitted. In addition, FIG. 12 similarly illustrates the effect of right-twisted elliptically polarizing plate 7 having the right helical structure of the first embodiment of the present invention. In this case, polarized light that can be propagated is r*-polarized light 6 and l*-polarized light 5. Here, l*-polarized light 5 is selectively absorbed within the elliptically polarizing plate while r*-polarized light 6 is optically rotated and emitted.

Figure 13:
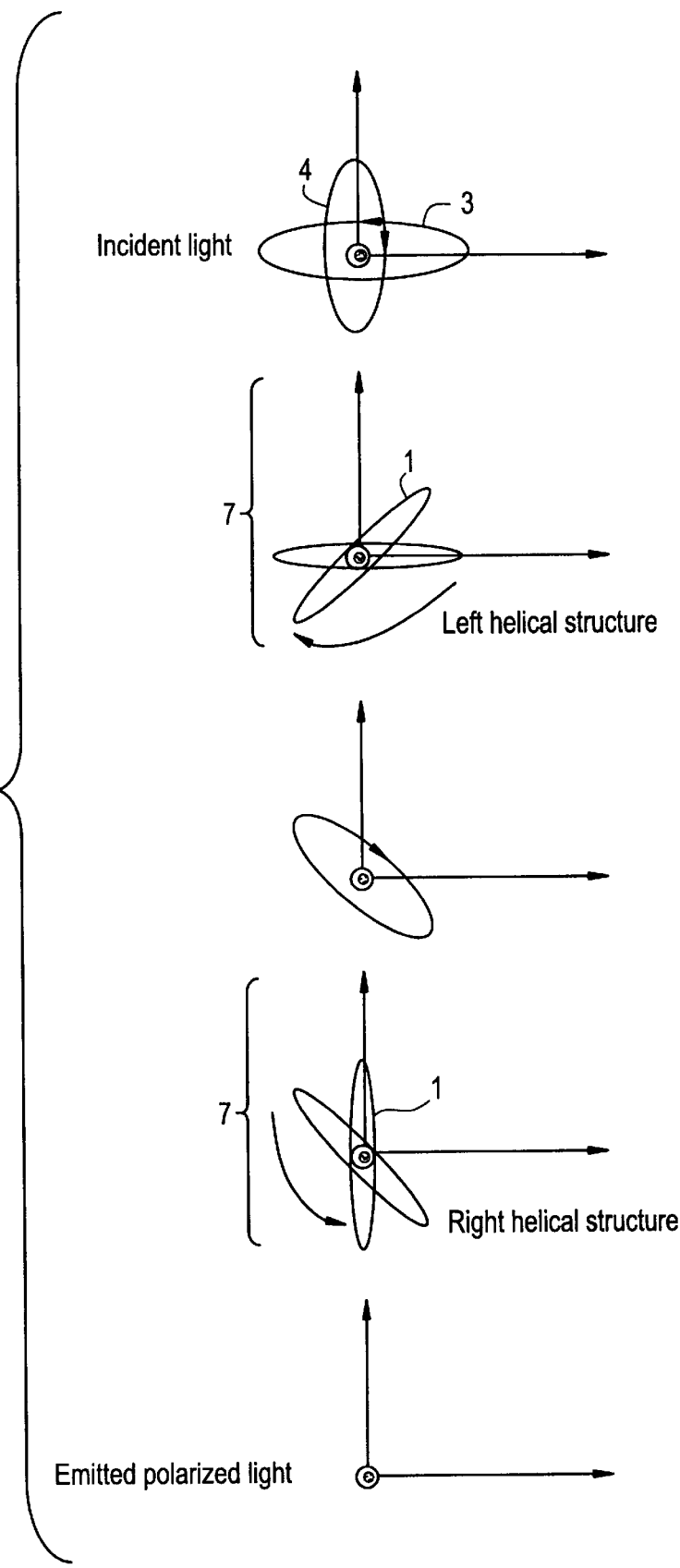
FIG. 13 is a plan view for illustrating the state of extinction due to an elliptically polarizing plate.

Accordingly, it can be seen that an extinction state is obtained if one pair of elliptically polarizing plates 7 is assembled and arranged as shown in FIG. 13. The characteristic transmission axis orientations are not orthogonal for this extinction state, and this results in a superior visual angle characteristic because of the absence of the previously explained shift in orthogonally arranged orientations when viewed from an angle.

Figure 14:
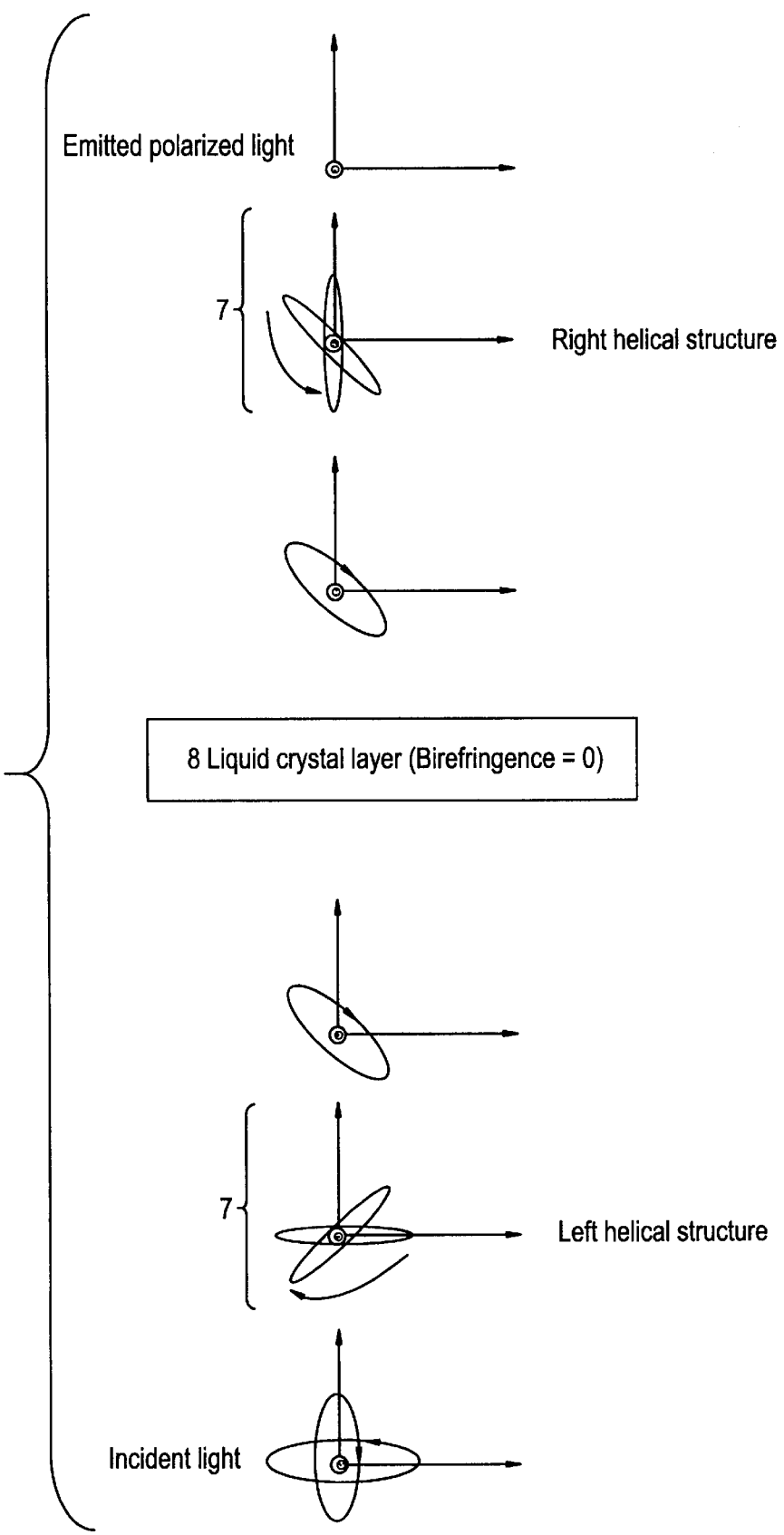
FIG. 14 is an explanatory view of a liquid crystal display device realized by the elliptically polarizing plate according to the second embodiment of the present invention.
Figure 15:
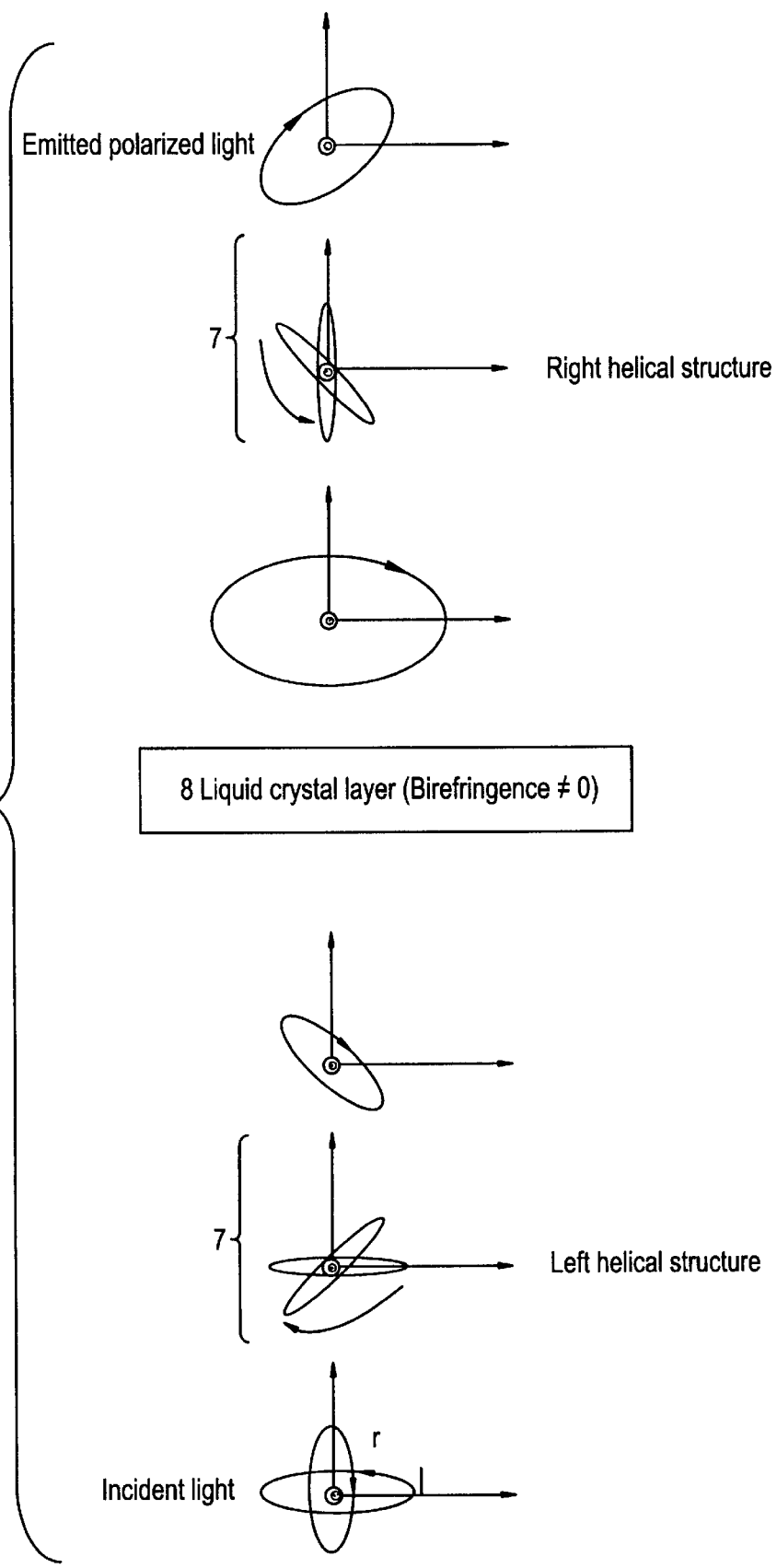
FIG. 15 is an explanatory view of a liquid crystal display device realized by the elliptically polarizing plate according to the second embodiment of the present invention.

To realize a display using liquid crystal, liquid crystal layer 8 is arranged between a pair of elliptically polarizing plates 7 as shown in FIG. 14. If the liquid crystal layer exhibits no birefringence, an extinction state equivalent to FIG. 13 can be obtained as shown in FIG. 14. In addition, if the liquid crystal layer exhibits birefringence, extinction does not occur at the elliptically polarizing plate on the emission side because elliptically polarized light emitted from liquid crystal layer 8 is modulated as shown in FIG. 15.

As described hereinabove, a liquid crystal display is enabled using the second embodiment of the present invention. In this case as well, the visual angle dependency of the liquid crystal display device is improved because the visual angle dependency of the sheet polarizer itself is improved.

Figure 16:
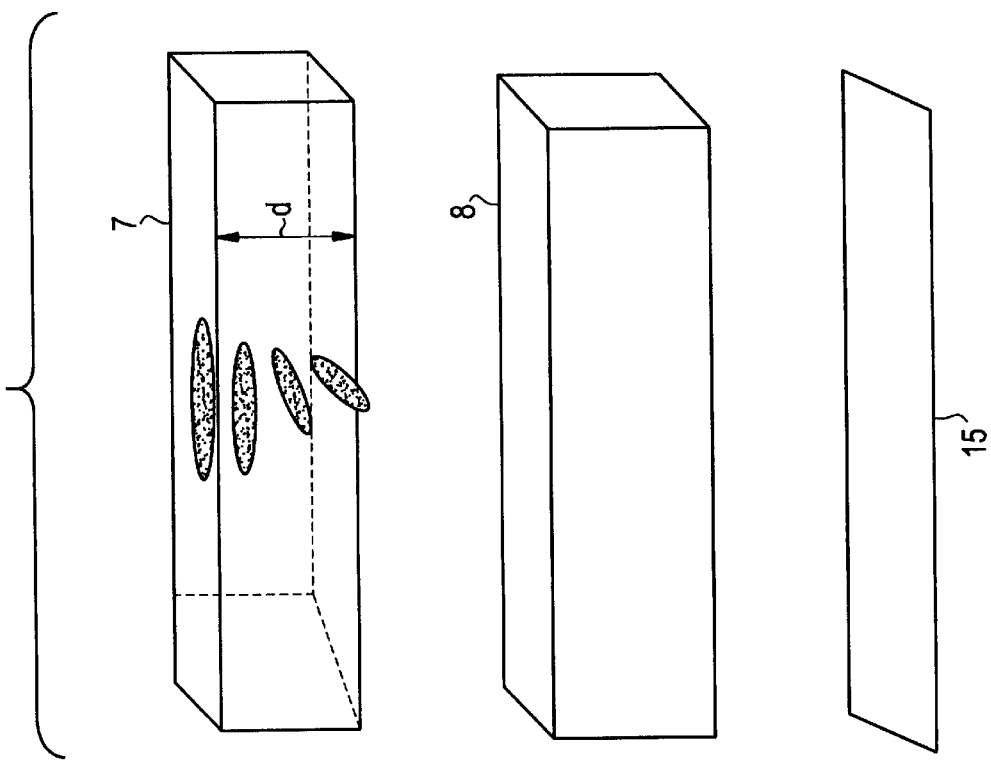
FIG. 16 is an explanatory view of a liquid crystal display device realized by the elliptically polarizing plate according to the third embodiment of the present invention.

Explanation is next presented regarding the third embodiment of the present invention. As shown in FIG. 16, the third embodiment of the present invention is constituted by the three-layer structure of elliptically polarizing 7, liquid crystal layer 8, and reflection plate 15. In this case, a fixed elliptically polarized light emitted by elliptically polarizing plate is incident to the liquid crystal layer. This elliptically polarized light is modulated in the liquid crystal layer. The direction of rotation of the elliptically polarized light is reversed when it reaches the reflection plate. The elliptically polarized light is then again modulated by the liquid crystal layer, and the form of the elliptically polarized light following modulation governs whether or not the elliptically polarized light can again pass through the elliptically polarizing plate. The display of light or dark can thus be effected by regulating the magnitude of modulation in the liquid crystal layer. In this case as well, the visual angle characteristic is superior to a case in which a linearly polarizing plate of the prior art is used.

The elliptically polarizing plate that emits elliptically polarized light of the first embodiment of the present invention can be obtained by dyeing the helical structure with a dichroic pigment. In such cases, dichroic pigments or dyes produced from iodine are widely known from the production methods of polarizing plates of the prior art.

A macromolecular chain that assumes a helical structure may be used as the helical structure. Alternatively, a cholesteric macromolecular liquid crystal may also be used.

Alternatively, the helical structure may be realized by fixing a low-molecular liquid crystal phase that takes on a helical structure. As a fixing method, a cholesteric liquid crystal and photosensitive substance may be added into a nematic liquid crystal to give rise to a helical structure, followed by photoreactive bonding. In addition, a nematic liquid crystal in which the liquid crystal itself has photosensitivity may also be used.

In any of these cases, the form of elliptically polarized light that is emitted can be controlled by controlling the angle of twisting by means of the pitch and thickness of the helical structure.

A wide variety of liquid crystal elements can be used in the second embodiment of the present invention.

Figure 17:
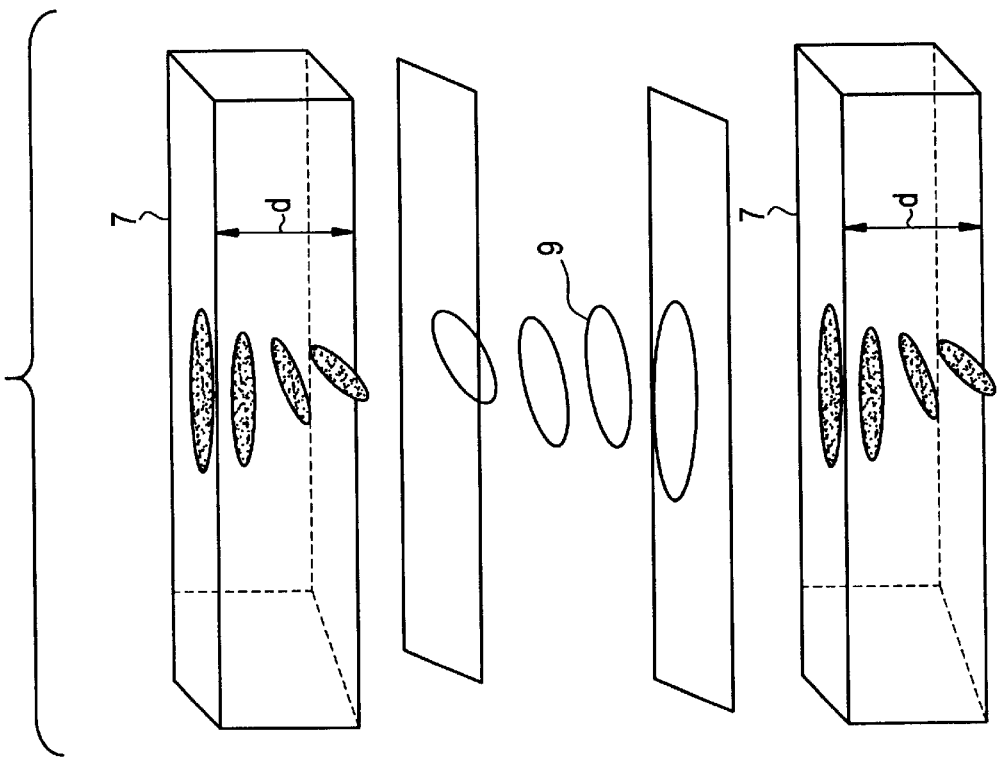
FIG. 17 is a structure view of the liquid crystal display device of the second embodiment of the present invention.

For example, as shown in FIG. 17, the same display effect can be achieved if twisted nematic liquid crystal 9 is placed between both elliptically polarizing plates 7 as the liquid crystal. In this case, extinction occurs when voltage is impressed. At this time, the extinction state is realized because the twisted nematic liquid crystal exercises no optical effect when voltage is impressed.

This device can be applied even in a case in which the liquid crystal is displaced horizontally due to the application of voltage as shown in FIG. 18. As an example of a liquid crystal that is displaced horizontally, there is also a case in which an electrode is provided horizontally and a nematic liquid crystal moves in a horizontal direction. There is also a case such as ferroelectric liquid crystal in which [the liquid crystal] is displaced in a horizontal direction by an electric field in a vertical direction, and the display of light and dark is also possible in such cases.

In another case, vertically oriented liquid crystal 10 constituted by nematic crystal having a negative dielectric anisotropy is inserted into an elliptically polarizing plate as shown in FIG. 19. In this case, an extinction state is obtained when voltage is riot impressed. When voltage is impressed to the liquid crystal, however, birefringence of the liquid crystal occurs, thereby disrupting the extinction state and allowing the emission of light.

Figure 20:
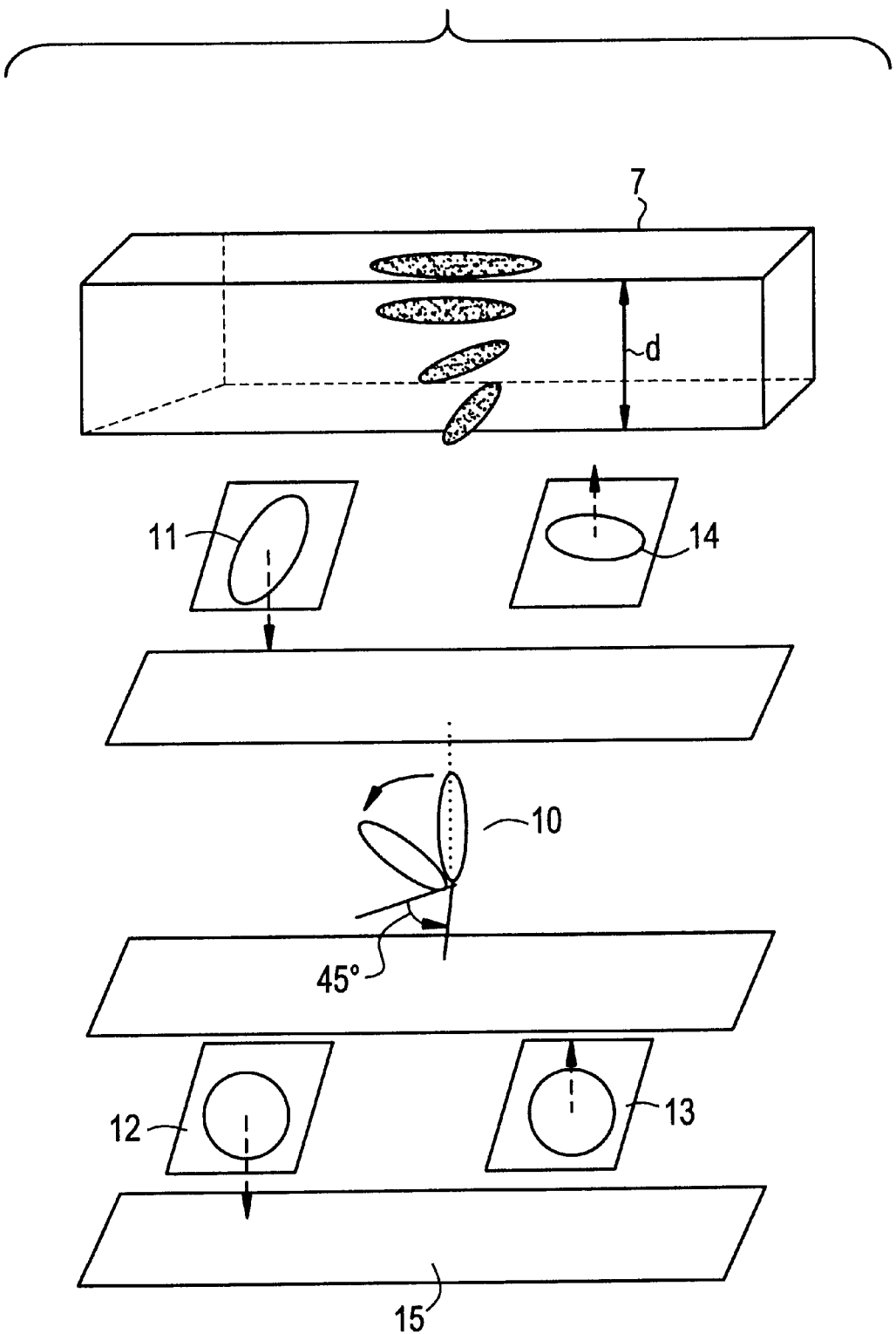
FIG. 20 is a structural view of the liquid crystal display device of the third embodiment of the present invention.

In the same way, nearly all liquid crystal elements can be used in the third embodiment of the present invention. In FIG. 20, vertically oriented liquid crystal 10 composed of a nematic liquid crystal having negative dielectric anisotropy is offered as one example. Here, elliptically polarizing plate 7 having a twist angle of 90° was used as the elliptically polarizing palte. In addition, the liquid crystal is arranged at a tilt so as to form an angle of 45° with respect to the main axis of elliptically polarized light that passes through the elliptically polarizing plate when voltage is impressed. If the liquid crystal is arranged in this way, the phase amount of the liquid crystal layer can be regulated and elliptically polarized light 11 incident to the liquid crystal layer can be made circularly polarized light 12. The direction of rotation of the circularly polarized light is reversed after reflection at the reflection plate. Due to the birefringence of the liquid crystal layer, the circularly polarized light 13 subsequently becomes elliptically polarized light 14 for which the orientation of rotation is opposite the orientation orthogonal to the original elliptically polarized light, whereby the light cannot pass through the elliptically polarizing plate, and dark display is obtained.

The conditions of the above-described dark state are disrupted and light display is obtained if the phase amount of the liquid crystal layer changes. In this way, the display of light and dark is made possible.

As described hereinabove, the present invention allows an improvement in visual angle dependency by means of an elliptically polarizing plate having a twisted structure, and through the use of the elliptically polarizing plate of the present invention, the invention has the technical merit of providing a liquid crystal display device that effects display using liquid crystal that has improved visual angle dependency.

While preferred embodiments of the present invention have been described using specific terms, such description is for illustrative purposes only, and it is to be understood that changes and variations may be made without departing from the spirit or scope of the following claims.

What is claimed is:

1. An elliptically polarizing plate having a twisted structure in which a dichroic substance is fixed within a helical structure; and that is designed such that:

incident light is split into left elliptically polarized light and right elliptically polarized light within said dichroic substance that forms said helical structure and propagated within said helical structure; said left elliptically polarized light and right elliptically polarized light are rotated along said helical structure;

one of said left elliptically polarized light and right elliptically polarized light is strongly absorbed and the other is weakly absorbed by a helical direction of said helical structure; and a fixed elliptically polarized light is emitted.

2. A liquid crystal display device, comprising:

a pair of elliptically polarizing plates having either left helical structure or right helical structure according to claim 1;

a liquid crystal layer which is arranged between said pair of elliptically polarizing plates; and means in which display of light or dark is effected according to whether or not birefringence occurs in said liquid crystal layer.

3. A liquid crystal display device, comprising:

one elliptically polarizing plate having either left helical structure or right helical structure according to claim 1;

a liquid crystal layer which is arranged between a reflection plate and said elliptically polarizing plate; and means in which: a fixed elliptically polarized light omitted by said elliptically polarizing plate is incident upon said liquid crystal layer and said elliptically polarized light is modulated; a direction of rotation of said elliptically polarized light is reversed when it reaches said reflection plate; said elliptically polarized light is again modulated in said liquid crystal layer, thereby a magnitude of modulation in said liquid crystal layer is regulated; and display of light or dark is effected.

* * * * *